(12) United States Patent
Klein-Hitpass et al.

(10) Patent No.: US 10,005,161 B2
(45) Date of Patent: Jun. 26, 2018

(54) LARGE TRANSMISSION GEARWHEEL AND PROCESS FOR PRODUCING A LARGE TRANSMISSION GEARWHEEL

(71) Applicant: Siemens Aktiengesellschaft, München (DE)

(72) Inventors: Arno Klein-Hitpass, Aachen (DE); Jean-Andre Meis, Duelmen (DE); Jan-Dirk Reimers, Aachen (DE)

(73) Assignee: FLENDER GMBH, Bocholt (DE)

( * ) Notice: Subject to any disclaimer, the term of this patent is extended or adjusted under 35 U.S.C. 154(b) by 156 days.

(21) Appl. No.: 14/428,796

(22) PCT Filed: Sep. 9, 2013

(86) PCT No.: PCT/EP2013/068540
§ 371 (c)(1),
(2) Date: Mar. 17, 2015

(87) PCT Pub. No.: WO2014/040927
PCT Pub. Date: Mar. 20, 2014

(65) Prior Publication Data
US 2015/0239076 A1 Aug. 27, 2015

(30) Foreign Application Priority Data
Sep. 17, 2012 (DE) .......... 10 2012 018 244

(51) Int. Cl.
*F16H 55/12* (2006.01)
*B23P 15/14* (2006.01)
(Continued)

(52) U.S. Cl.
CPC .............. *B23P 15/14* (2013.01); *F16H 55/17* (2013.01); *B23K 2201/008* (2013.01); *Y10T 29/49476* (2015.01); *Y10T 74/1987* (2015.01)

(58) Field of Classification Search
CPC .... B23P 15/14; F16H 55/17; Y10T 29/49476; Y10T 74/1987; B23K 2201/008
See application file for complete search history.

(56) References Cited

U.S. PATENT DOCUMENTS 2,730,795 A   1/1956  Bloss
3,327,626 A * 6/1967  Stefanik ............... B41J 1/32
                                                  101/110
(Continued)

FOREIGN PATENT DOCUMENTS

CN      1974115 A    6/2007
CN    102091920 A    6/2011
(Continued)

OTHER PUBLICATIONS

Translation of CN 101898297 A.*
(Continued)

*Primary Examiner* — Jun Yoo
(74) *Attorney, Agent, or Firm* — Henry M. Feiereisen LLC

(57) ABSTRACT

The invention relates to a process for producing a large transmission gearwheel (1; 31; 36) consisting of a plurality of individual components, said process comprising the successive steps of: providing the individual components, which include at least one hub (2; 32; 37), a disc wheel (3, 4; 18, 19; 22; 24; 27; 33, 34; 38, 39) and a toothed ring (5; 20; 21; 23; 26; 35; 40) produced from case-hardened steel; at least partially mechanically soft machining the individual components; joining the individual components using a beam welding process; case hardening the individual components which have been joined to one another, and hard machining at least the toothed ring (5; 20; 21; 23; 26; 35; 40). The invention furthermore relates to a large transmission gearwheel produced by such a process.

11 Claims, 4 Drawing Sheets

(51) Int. Cl.
  *F16H 55/17* (2006.01)
  *B23K 101/00* (2006.01)

(56) References Cited

U.S. PATENT DOCUMENTS

| | | |
|---|---|---|
| 4,118,848 A | 10/1978 | Hansgen |
| 5,933,955 A | 8/1999 | Barnhart |
| 2002/0182002 A1* | 12/2002 | Toelle ............... B23K 26/12 403/359.1 |
| 2008/0245777 A1 | 10/2008 | Pullen |

FOREIGN PATENT DOCUMENTS

| | | | |
|---|---|---|---|
| CN | 101898297 B | 9/2011 | |
| CN | 102407432 A | 4/2012 | |
| DE | 911500 | 5/1954 | |
| DE | 917589 B | 9/1954 | |
| DE | 8205946 U1 | 4/1983 | |
| DE | 19737111 A1 | 3/1999 | |
| EP | 1719572 A2 | 11/2006 | |
| GB | 1200810 A * | 8/1970 | ............. F46D 1/068 |
| JP | S618232 A | 1/1986 | |
| JP | 2004360760 A | 12/2004 | |

OTHER PUBLICATIONS

Yang Junmeng; "Application of electron beam welding in automobile parts production"; Foreign Automotive; pp, 37-42; 1975.
Erhardt et al; "Elektronenstrahlschweissen ormöglicht neue Fertigungstechnoiogien"; Fertigungstechnik und Betrieb; vol. 28; pp. 299-302; XP009176167; 1978.

* cited by examiner

LARGE TRANSMISSION GEARWHEEL AND PROCESS FOR PRODUCING A LARGE TRANSMISSION GEARWHEEL

CROSS-REFERENCES TO RELATED APPLICATIONS

This application is the U.S. National Stage of International Application No. PCT/EP2013/068540, filed Sep. 9, 2013, which designated the United States and has been published as International Publication No. WO 2014/040927 and which claims the priority of German Patent Application, Serial No. 10 2012 018 244.9, filed Sep. 17, 2012, pursuant to 35 U.S.C. 119(a)-(d).

BACKGROUND OF THE INVENTION

The invention relates to a large transmission gearwheel which is produced from a plurality of individual components welded together and a method for producing such a large transmission gearwheel.

It is known to produce large transmission gearwheels, i.e. gearwheels with diameters of more than 600 mm, as one-piece gearwheels.

A drawback with the one-piece configuration of large gearwheels is that they are extremely disadvantageous in terms of the material required and production weight. As a solution to the weight problem it is known to design large gearwheels with the incorporation of beads. To this end, material is removed during the course of a turning operation of the lateral surfaces of the wheel. As a result, however, the production costs are increased as further cutting operations are required for incorporating the beads and the removed material results in costs in the purchase of unmachined parts.

A further problem occurs with case-hardening. During this process, a large amount of energy is introduced into the component which, during the quenching process, may lead to significant component deformation. This component deformation has to be compensated both in advance by costly structural measures and retrospectively by a corresponding removal of material. As the retrospective removal of material has to take place in the hardened state of the component, it is associated with significant costs and accordingly is not cost-effective. As a structural counter-measure, it is firstly known to design the component with corresponding allowances so that it is possible to remove material retrospectively to the desired dimensions. Secondly, for improved hardenability and/or for improving the quenching process, boreholes are incorporated in the component which are intended to ensure that the quenching medium is flushed around the component more uniformly, in order to achieve an improved temperature profile of the component during the cooling thereof and thus reduced deformation.

In spite of these expensive and complex countermeasures, however, in practice it is only possible with difficulty to restrict the component deformation to limited regions and in a controlled manner. As a result, large gearwheels, which are configured in one piece and which are produced in the manner described above, are a cost-efficient compromise between material costs and production costs but as a whole only cost-effective to a limited degree.

As an alternative to one-piece gearwheels, hybrid gearwheels which are made up of a plurality of components are known, and namely consisting of at least one hub, a wheel body arranged on the hub and a toothed ring arranged on the outer periphery of the wheel body. Very different embodiments of such hybrid large transmission gearwheels which essentially differ in the manner in which the individual components are fastened together and in the design of the individual components are already known in the prior art. The textbooks: Machine Elements by Roloff Matek and Machine Elements by Niemann Winter Höhn, and/or patent documents, such as DE 911 500 B, DE 917 589 B and DE 82 05 946 U1, provide an overview of the prior art for the production of hybrid large transmission gearwheels.

The fastening of individual components to one another may be carried out mechanically. Thus the toothed ring may be screwed, for example, to the wheel body. Alternatively, it is also known to shrink the toothed ring onto the wheel body, wherein the toothed ring is frequently secured against a relative movement with regard to the wheel body by corresponding positive locking devices.

Alternatively, the individual components may also be connected together by a material connection, by means of welding, for which nowadays welding methods using consumable electrodes are exclusively used. In addition to the reliability of the gear teeth, welded gearwheels have to be designed relative to their interface properties. The joint interfaces are made up from the combinations of components including the toothed ring and wheel body (so-called gear rim), the wheel body and hub as well as the hub and shaft. These joints have to be included in the design calculations and production planning. Moreover, the cost thereof in terms of production technology and the subsequent effect thereof on component function also has to be taken into account.

The wheel body may be configured in one piece, for example as a cast part. It is also possible to manufacture the wheel body as a welded structure. Welded wheel bodies are used, in particular, in the construction of large transmissions in quantities of 1 to 5, as they often represent the only possibility of economical production.

A known production sequence for hybrid large transmission gearwheels is, for example, the provision of unmachined parts, pre-turning, welding, gear teeth cutting, optionally induction hardening, gear teeth grinding and subsequent quality control.

The welding work carried out in hybrid large transmission gearwheels is exclusively implemented by means of MIG welding (metal inert gas welding), electrode welding or submerged arc welding. All these methods use consumable electrodes and a relatively high amount of energy per unit distance and therefore have a significant effect on the metallurgical properties of the connection and the basic material. The welding process as such causes high residual stresses in the steel structure. Therefore, it is usual nowadays for the person skilled in the art to carry out stress relief tempering after the welding treatment in order to dissipate stresses, so as to prevent further production steps potentially releasing these stresses as deformation, such as for example when incorporating beads, when asymmetrically reducing the wall thickness or the like. These deformations which accompany the production process are known and lead to faults in the welded structure. Accordingly, highly accurate dimensional machining of a welded large transmission gearwheel is only possible after carrying out stress relief tempering.

The hardening of the welded component takes place by means of induction hardening. This method has the advantage that only a relatively small amount of thermal energy is introduced locally into the component, whereby a high level of component deformation is prevented.

Case-hardening of the welded component, as is used in large transmission gearwheels configured in one piece, is not used in hybrid large transmission gearwheels due to the high residual stresses introduced by the welding process using consumable electrodes. In large transmission gearwheels a relatively low level of component deformation already leads to considerably greater deviations in shape than in small gearwheels, due to the relatively large dimensions, in particular the large diameter of the gearwheel. The deformation due to the dissipation of the residual stress as a result of welding and the deformation due to hardening would cumulatively be so great that costly mechanical post-treatment might be necessary in the hardened state of the component. However, this is undesirable as it leads to substantial costs. Accordingly, in known large transmission gearwheels the toothed ring is always manufactured from hardened and tempered steel.

A drawback with hybrid large transmission gearwheels available nowadays, relative to large transmission gearwheels configured in one piece, is that they are only able to be used for small surface loads as the hardened and tempered toothed rings have a lower load-bearing capacity than case-hardened toothed rings. Whilst the flank strength in hybrid large transmission gearwheels ranges from approximately 600-800 $N/mm^2$, large transmission gearwheels which are configured in one piece and case-hardened have a flank strength of approximately 1500 $N/mm^2$, and with carbonitriding up to 1700 $N/mm^2$. A further drawback is that the aforementioned welding methods are highly manual, which is why they are only able to be used cost-efficiently in batch production. The detection of process data during mass production does not currently form part of the prior art and is only able to be documented by means of retrospective quality controls.

Due to the dimensions in small gearwheels, deviations arising from component deformation lead to fewer deviations of shape than in large transmission gearwheels which is why in hybrid large transmission gearwheels the aforementioned problem of deformation introduced into the component by welding and hardening only plays a minor role, in particular if only lower grade materials are required for the gear teeth as they are used in the context of fatigue strength. This is the case in mobile transmission applications, such as for example in heavy goods vehicles and utility vehicles.

SUMMARY OF THE INVENTION

Based on this prior art it is an object of the present invention to provide an economical method for producing a large transmission gearwheel as well as a large transmission gearwheel which has a low dead weight and is designed for the highest loads.

To achieve this object the present invention provides a method for producing a large transmission gearwheel consisting of a plurality of individual components, said method comprising the successive steps of:

a) providing the individual components which comprise at least one hub, a disk wheel and a toothed ring produced from case-hardened steel, b) at least partially mechanically soft machining the individual components, c) joining the individual components using a beam welding method, d) case hardening the individual components which have been joined to one another and e) hard machining at least the toothed ring.

The present invention is based on the surprising recognition that by combining a beam welding method and case hardening only a small degree of component deformation is associated therewith, which may be compensated at low cost during the course of the subsequent hard machining step, without a large allowance having to be made therefor. The applicant assumes that the residual stresses which are introduced into the component by the beam welding method are so small that they are entirely dissipated during the case hardening. Accordingly, only the component deformation associated with case hardening remains, said component deformation being comparable with corresponding deformation during the production of large transmission gearwheels configured in one piece and accordingly being able to be controlled. This deformation may also be modified according to the invention by means of the considerably more flexible design of the wheel body structure, such that it results in less deformation.

The present invention, therefore, provides a method in which a hybrid case-hardened large transmission gearwheel is produced which combines the advantages of the known hybrid large transmission gearwheels and the advantages of the known large transmission gearwheels configured in one piece. Due to the hybrid design a large transmission gearwheel with low dead weight is achieved with low material consumption. As a result of the case-hardening, flank strengths of at least 1250 $N/mm^2$, preferably 1500 to 1700 $N/mm^2$, are achieved.

Moreover, the beam welding method and thus the method according to the invention are in turn suitable for mass production and capable of recording process documentation of the joining process. Beam welding is a method which by comparison is suitable for mass production as it is able to be automated, but in particular it is able to be easily provided with process data monitoring. These are industry-specific requirements for quality control, which may be easily represented by this process. In this case, the present invention utilizes the fact that in the meantime sufficiently large vacuum chambers have become available in order to use the beam welding method for the advantageous production of large transmission gearwheels. The novel use of a beam welding method also results in the possibility of adapting features of production technology and seam preparation to one another such that advantages are provided for the assembly and the turning process. Moreover, the modification of the stiffness of the welded ring has a positive effect and may at the same time be combined with a production technique which is suitable for mass production as it is cost-effective.

By means of the case hardening which comprises the machining steps of carburizing, hardening and tempering, a maximum flank strength and root strength is achieved. According to the current prior art, the highest specific power density and reliability as may be required with highly-loaded, possibly slow moving, large transmissions is only to be achieved by such case hardening.

Preferably in step c) the electron beam welding method is used as the beam welding method. Electron beam welding which is well suited to mass production produces very little deformation by comparison. As a result, particularly good results are able to be achieved.

According to a further embodiment of the invention, which is also surprising, the laser beam welding may be used under vacuum and/or partial vacuum. Here there is the additional advantage of a more cost-effective vacuum chamber as lower vacuum pressures have to be achieved than in electron beam welding.

According to an embodiment of the method according to the invention, hard turning and gear teeth grinding take place during the course of the hardening treatment carried out in step e). In this manner, gear teeth of the highest quality may be produced.

Advantageously, the disk wheel is provided with at least one recess arranged eccentrically, in particular a plurality of recesses arranged eccentrically. Such recesses ensure effective penetration of the carbonizing gases and the quenching medium, as well as vapor discharge and the ability to be flushed through and cleaned.

According to an embodiment of the method according to the invention, the deformation of the large transmission gearwheel is adjusted by an asymmetrical design of the disk wheel. Thus the gearwheel deformation is influenced by an asymmetric wheel body design, i.e. the design of the wheel structure enables the deformation to be influenced. The wheel body structure may be designed so that less deformation results. This may be achieved, for example, by a contour of the recesses deviating from the circular shape. It is also possible that the disk wheels in each case are provided with recesses arranged eccentrically, wherein the recesses in each case have different shapes and are distributed asymmetrically on the disk wheels. The component deformation, which is not able to be avoided during the case hardening, may be minimized by a suitable choice of shape and position of the recesses. These recesses ensure correct penetration of carbonizing gases during the carbonizing. Moreover, the quenching means is distributed uniformly during the quenching process, such that it is possible for the temperature distribution in the individual regions of the large transmission gearwheel to be as uniform as possible during the cooling and/or quenching, whereby component deformation is effectively counteracted due to local temperature differences. The fact that the temperature profile is influenced by the asymmetrical ribs which act to reduce deformation relative to the toothed ring during quenching, results in gearwheels which may be produced economically as the subsequent grinding, which forms a considerable proportion of the costs, is substantially reduced.

Preferably, the disk wheel is of asymmetrical configuration in order to adapt, in particular, the stiffness of the large transmission gearwheel to application-specific loads and to influence the load-bearing behavior. In this manner, a consistent load-bearing behavior may be achieved over a wide load range. Thus, for example, the thickness of the toothed ring on one side may be increased relative to the other side for the purpose of reinforcement.

According to an embodiment of the method according to the invention, the individual components have two disk wheels which are arranged axially spaced apart from one another.

The disk wheels may be connected together by means of tubular strips for the purpose of reinforcement.

Advantageously, both disk wheels are mounted from one side relative to the toothed ring and this toothed ring has also been previously machined internally in step b) from the same side in one clamping operation, so that the two disks are aligned with one another in their seat in the toothed ring. Clamping on both sides would make this difficult when machining from both sides. Accordingly, it is possible advantageously to dispense with the clamping of the tool on both sides during production, whereby the method sequence is designed to be simpler and more cost-effective. The welding then takes place on both sides in the welding direction, see also FIG. 5. Thus the novel use of the beam welding method results in the possibility of adapting features of production technology and seam preparation to one another, so that it provides advantages for the assembly and the turning process.

According to an embodiment of the method according to the invention, the stiffness of the large transmission gearwheel is adjusted by the asymmetrical configuration of the thickness of the toothed ring, whereby a uniform load-bearing behavior is able to be achieved over a wide load range. The asymmetrical design of the rings permits a modification of the load-bearing behavior of the teeth due to the hybrid construction. Additionally, as a V-shaped joint preparation is not required, the beam welding enables the structural freedoms of the narrow seam guide to be utilized for the first time. By locally reducing the thickness of the toothed ring in the edge regions, in particular, corner supports may be avoided. Further details for modifying the thickness, of the toothed ring are described with reference to FIGS. 4 to 6.

Preferably, according to an embodiment of the method according to the invention, viewed in the welding direction, the rear end of at least one weld joint is formed by a radially protruding projection which is part of one of the components to be welded together. Such a projection at the end of a welded joint serves as weld pool support and simplifies the implementation of the welding method.

To achieve the object mentioned in the introduction, the present invention further provides a large transmission gearwheel which is produced from a plurality of individual components welded together which cornprise at least one hub, a disk wheel and a case-hardened toothed ring, wherein the gearwheel is produced, in particular, according to a method as claimed in one of the preceding claims. At this point it should be reiterated that the term "large transmission gearwheel" is understood within the meaning of the present invention as a gearwheel with an external diameter of more than 600 mm. The principal advantages of the large transmission gearwheel according to the invention are, in particular, the low dead weight with low material consumption and the high flank strength of 1250 N/mm$^2$ or more, preferably more than 1500 N/mm$^2$, due to which the gearwheel is suitable for large transmissions which have to withstand the highest loads, such as for example wind power transmissions or the like.

The disk wheel is preferably provided with at least one recess arranged eccentrically, in particular with a plurality of recesses arranged eccentrically, which in particular has/have a contour deviating from a circular shape. As has been already explained above, such recesses assist and facilitate the hardening and cleaning process.

Advantageously, the toothed ring comprises a connecting portion with a connecting surface along which the toothed ring is welded to the disk wheel and a toothed ring portion on which the gear teeth are formed, wherein at least one transition radius is provided between the connecting portion and the toothed ring portion; said transition radius being arranged spaced apart from the weld seam connecting the toothed ring and the disk wheel together. The spacing between the transition radii and the welded seam serves for decoupling the notch effect produced by the weld seam.

According to an embodiment of the gearwheel according to the invention, two disk wheels which are arranged spaced apart from one another are provided.

The two disk wheels are preferably connected together via tubular strips for reinforcing purposes.

BRIEF DESCRIPTION OF THE DRAWING

Further features and advantages of the present invention are revealed from the following description of exemplary embodiments of the present invention with reference to the accompanying drawings, in which.

DETAILED DESCRIPTION OF PREFERRED EMBODIMENTS

Figure 1:
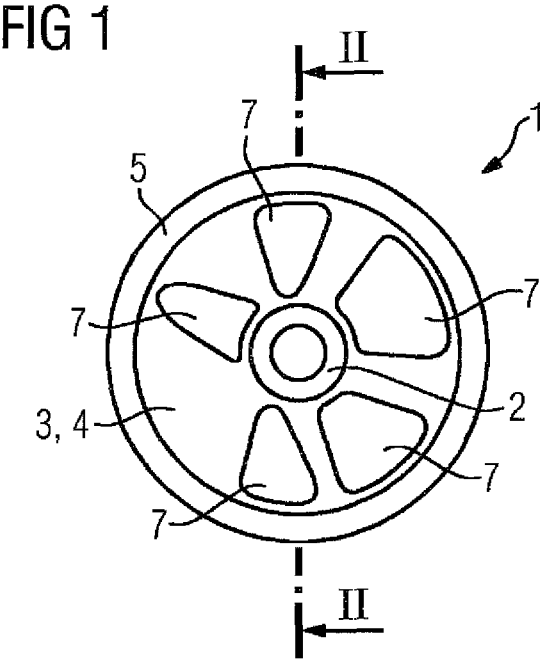
FIG. 1 is a schematic side view of a large transmission gearwheel according to an embodiment of the present invention.
Figure 2:
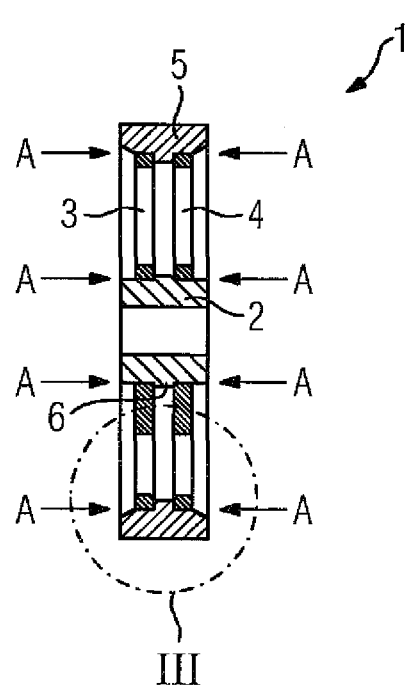
FIG. 2 is a cross-sectional view along the large transmission gearwheel shown in FIG. 1 along the line II-II in FIG. 1.
Figure 3:
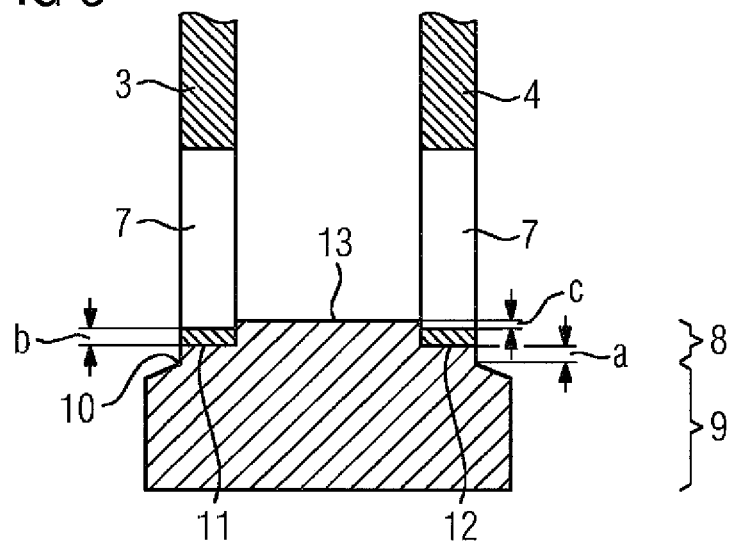
FIG. 3 is an enlarged view of the detail III in FIG. 2.

FIGS. 1 to 3 show a large transmission gearwheel 1 according to an embodiment of the present invention. The large transmission gearwheel 1 is a hybrid gearwheel which is produced from a plurality of individual components and namely from a hub 2, two disk wheels 3 and 4 and a toothed ring 5, which are welded together at the positions illustrated by the arrows A.

The hub 2 is configured to be substantially cylindrical and comprises a radially protruding projection 6 which extends substantially centrally along the periphery of the hub 2 and serves as a stop for positioning the disk wheels 3 and 4.

The disk wheels 3 and 4 in each case are provided with recesses 7 arranged eccentrically. The recesses 7 in each case have different shapes and are distributed asymmetrically on the disk wheels 3 and 4 arranged as shown in FIG. 1.

The toothed ring 5 is produced from a case-hardened steel and is case hardened. It comprises a connecting portion 8 and a toothed ring portion 9 configured in one piece therewith, which are connected together via a transition radius 10. The connecting portion is provided with two annular connecting surfaces 11 and 12 along which the toothed ring 5 is welded to the disk wheels 3 and 4. Between the connecting surfaces 11 and 12 extends a radially inwardly protruding projection 13 which serves as a stop for the disk wheels 3 and 4. The dimension a illustrated in FIG. 3 denotes the radial distance between the transition radius 10 and the connecting surfaces 11 and 12 and/or the weld seams provided there. The distance a is selected to be of such a size that the notch effect, which is produced by the weld seams provided as closed circumferential seams, is safely decoupled. The dimension b illustrated in FIG. 3 denotes the minimum ring thickness of the disk wheels 3 and 4 for producing a weld seam which is thermally acceptable along the recesses 7 provided on the disk wheels 3 and 4, in order to ensure a substantially uninterrupted and symmetrical dissipation of heat.

The dimension c in FIG. 3 is the difference between the radial height of the ring projection 13 of the toothed ring 5 and the minimum ring thickness b of the disk wheels 3 and 4 which is required to form a structure through which the media used during case-hardening is able to flow and pass through, as described in more detail hereinafter.

The dimensions a, b and c are selected in accordance with the structure based on a corresponding calculation.

The large transmission gearwheel 1 shown in FIGS. 1 to 3, according to an embodiment of a method according to the invention is produced as follows. In a first step, the individual components are produced, i.e. the hub 2, the two disk wheels 3 and 4 and the toothed ring 5. In a further step a mechanical soft machining is carried out on the individual components. In this case, the hub 2 is subjected to a turning operation. Subsequently, the toothed ring 5 is provided with its gear teeth, which may be carried out for example during the course of a hobbing treatment. Subsequently, the disk wheels 3 and 4 are inserted and/or pressed between the hub 2 and the toothed ring 5. Simple interference fits of the disk wheels 3 and 4 should be used here. The radii in the projections of the contact surfaces for the disks in the region of the radial and axial stop surfaces have to be considered according to the internal chamfer of the disk to be inserted. The disks also advantageously have a larger radius internally than on the external side where the welding will take place. The preparation of the weld seam should, however, be implemented by considering costs and avoiding unnecessary projecting portions. In a further step the individual components are then connected together at the positions identified by the arrows A by using a beam welding method, wherein the beam welding method is preferably an electron beam welding method. Alternatively, a laser beam welding method under vacuum or partial vacuum may also be used.

Subsequently, the large transmission gearwheel 1 is case hardened in the welded state, whereby the toothed ring 5 obtains a flank strength of 1250 N/mm$^2$, preferably 1500 N/mm$^2$ or more. This is followed by a hard machining process, the grinding of at least the toothed ring 5 being carried out during the course of this hard machining process. However, a hard machining of the hub 2 and/or the disk wheels 3 and 4 may also be carried out, for example, during the course of a hard turning process.

A substantial advantage of the described method is that during the beam welding of the individual components only a small amount of heat is introduced into the component which results in relatively small residual stresses caused by the welding method in comparison with the conventionally used welding methods using consumable electrodes.

Accordingly, these may be dissipated by the thermal treatment taking place during the case hardening (stress relief tempering). By the corresponding choice of the dimension a, i.e. the distance of the transition radii 10 from the weld seams and/or connecting surfaces 11 and 12, the notch effect is also decoupled. Due to the case hardening a very high flank strength is provided to the toothed ring 5, so that the large transmission gearwheel 1 is able to withstand the highest loads. The unavoidable component deformation during the case hardening is minimized by the corresponding choice of shape and position of the recesses 7. These recesses 7 ensure effective penetration of carbonizing gases during the carbonizing. Moreover, the quenching means are distributed uniformly during the quenching process, such that the temperature distribution is as uniform as possible in the individual regions of the large transmission gearwheel 1 during cooling and/or quenching, effectively counteracting component deformation due to local temperature differences. Moreover, the ability to clean the large transmission gearwheel 1 is also improved by means of the recesses 7. It should be clear that the recesses 7 may also be configured and arranged differently. For example, a symmetrical arrangement of circular recesses 7 may also be selected if this results in a component having low deformation.

A further advantage of the method according to the invention is that the hard machining may be carried out at relatively low cost due to the low component deformation during the aforementioned method steps, which is why the costs for the hard machining are relatively small.

It should be clear that further steps for quality control may be associated with the previously described method steps. Moreover, reference should be made to the fact that the large transmission gearwheel 1 may also have only one individual disk wheel.

Figure 4:
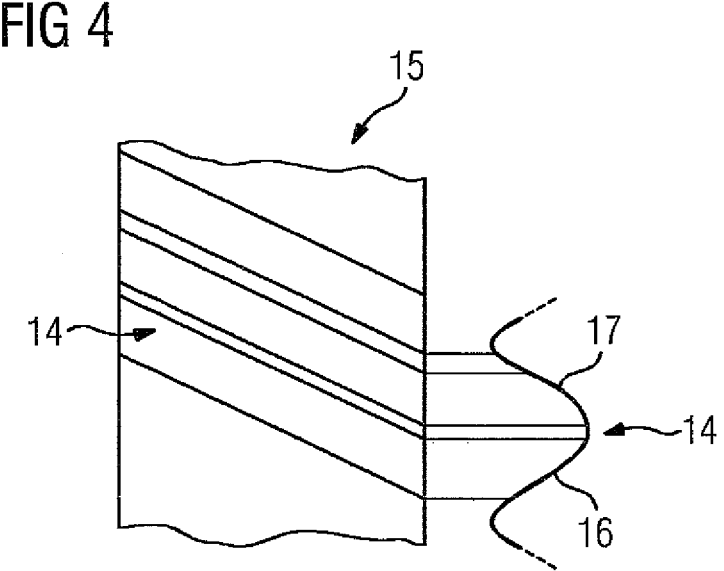
FIG. 4 is a basic sketch which shows the tooth profile of oblique gear teeth of a toothed ring.

FIG. 4 shows schematically the tooth profile 14 of oblique gear teeth of a toothed ring 15 in plan view and in side view. The driving gearwheel 15 moves during the operation with the sharper tooth edge 16 into the driven wheel (not shown). In principle, this tooth edge 16 is less stiff than the opposing tooth edge 17 which has an obtuse angle. The contact pattern of the oblique gear teeth moves with increasing load from the tooth edge 16 to the tooth edge 17 and is optimized according to a specific topographical correction in the contact pattern.

The load-bearing behavior of gearwheels is, in particular in the case of high-strength, case-hardened gearwheel materials which permit a high load carrying capacity, superimposed by a noticeable deformation of the resilient transmission parts and components. In addition, the flexion at the tooth tips is generally many times greater than the shape deviations on the tooth as a result of the production process. The loading also causes deflections and twisting of the pinion shaft and gearwheel shaft, pinion body and disk wheel body and lowering of the bearings and housing deformations. This results in misalignments of the tooth flanks which are frequently considerably greater than the flank line deviations as a result of the production process. This results in a non-uniform bearing of the gear teeth surface in height and width, which influences both the load-bearing capacity and the noise behavior.

In order to reproduce the high load-bearing capacity of high-strength gearwheels and to reduce greater noise development, specific deviations from the involute (height modification) and the theoretical flank line (width modification) are made in order to obtain almost ideal geometries with uniform load distribution under load.

When determining the height and width modifications the entire area of influence of the substructure has to be taken into account. The deformation chain via the gearwheel, the shaft, the bearing, the housing and the housing connection to the main shaft has to be considered. By modifying the height at the tooth tip or at the tooth root and by modifying the flanks or width, the involute is superimposed by a correction shape which is intended to permit a uniform bearing of the teeth and the dissipation of the load concentrations at the tooth ends during axial displacements. These influences are calculated on the individual components and then added together and transferred as an interface to the adjacent gear teeth layout and also have to take into account the respective joints of the welded large transmission gearwheels. In particular, the shaft deformation, the bearing deformation, the production tolerances which have to be considered, the deformation of the gear teeth and the deformation of the joined disk wheels have to be allowed for. Thus a further problem is to consider specifically the deformation of the welded large transmission gearwheel with highly loaded gearwheels.

Figure 5:
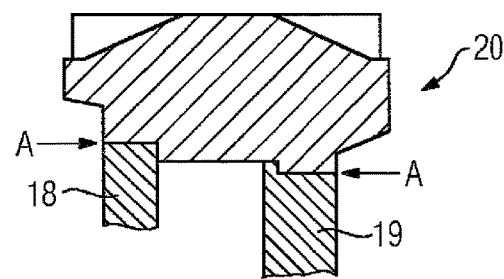
FIG. 5 is a schematic partial cross-sectional view of a toothed ring of a large transmission gearwheel according to a second embodiment of the present invention.
Figure 6:
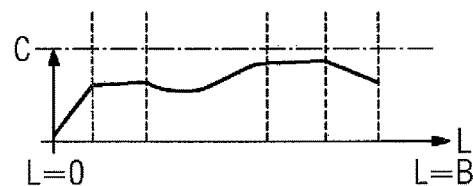
FIG. 6 is a diagram which shows the stiffness profile of the toothed ring shown in FIG. 5 over the width of the toothed ring.

FIGS. 5 and 6 show a variant in the stiffness which is able to be produced according to the invention. Due to an increase in the thickness of the toothed ring on one side, according to the invention the stiffness may be manipulated for embedding the toothed ring. This may be associated with both the driving wheel and for the driven wheel, so that a superimposition takes place with the correction shape of the gear teeth for a more uniform load-bearing behavior over a wider loading range. FIG. 5 shows a toothed ring 20 welded to the disk wheels 18 and 19, which is the toothed wheel 15 of the driving wheel in the modified state shown in FIG. 4. An advantage of this modification according to the invention is that the edge regions of the gear teeth of the toothed ring 20 due to locally reduced thickness of the toothed ring are supported in a less rigid manner in order to avoid corner supports, i.e. excessive and damaging support only via the edges. Moreover, the interfaces between the disk wheels 18 and 19 and the toothed ring 20 are easily accessible by reducing the thickness of the toothed ring on the radial internal edge regions of the toothed ring 20, whereby a positive weld beam coupling is permitted in the direction of the arrows A. A further positive effect is that the turning machining of the toothed ring 20 is possible on one side during the soft machining process, whereby costly clamping on both sides of the component is avoided.

Figure 7:
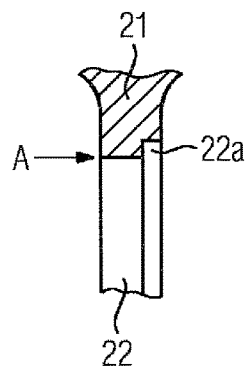
FIG. 7 is a schematic enlarged cross-sectional view of a transition between the disk wheel and the toothed, ring of a large transmission gearwheel according to a third embodiment of the present invention which shows a possible weld pool support.
Figure 9:
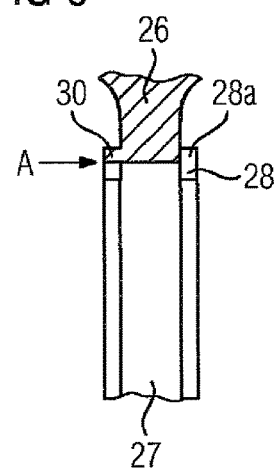
FIG. 9 is a schematic enlarged cross-sectional view of a transition between the disk wheel and toothed ring of a large transmission gearwheel according to a fifth embodiment of the present invention which shows a possible weld pool support.

FIGS. 7 and 9 show schematic enlarged cross-sectional views of transitions between the disk wheel and the toothed ring of a large transmission gearwheel according to different embodiments of the present invention, which show possible variants of weld pool supports.

FIG. 7 shows a toothed ring 21 which is welded to a disk wheel 22. To achieve an inner weld pool support the disk wheel 22 is provided at its rear end—viewed in the welding direction (arrow A)—along its outer periphery with a peripheral radially outwardly protruding projection 22a which engages in a correspondingly configured recess which is configured on the periphery at the rear end of the inner periphery of the toothed ring 21.

Figure 8:
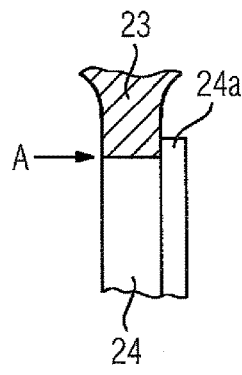
FIG. 8 is a schematic enlarged cross-sectional view of a transition between the disk wheel and toothed ring of a large transmission gearwheel according to a fourth embodiment of the present invention which shows a possible weld pool support.

FIG. 8 shows a toothed ring 23 which is welded to a disk wheel 24, wherein the width of the disk wheel is selected to be larger than the width of the toothed ring 23. To achieve an outer weld pool support the disk wheel 24 is provided at its rear end—viewed in the welding direction (arrow A)—along its outer periphery with a radial outwardly protruding projection 24a which encompasses the toothed ring 23 at the rear.

FIG. 9 shows a toothed ring 26 which is welded to a disk wheel 27. The disk wheel 27 is provided along its outer periphery with a projection 28 protruding axially on both sides, at the rear end thereof—viewed in the welding direction (arrow A)—a peripheral radially outwardly protruding projection 28a being configured which encompasses the toothed ring 26 to the rear. The toothed ring 26 is also provided along its internal periphery with a projection 30 protruding axially to the front (counter to the welding direction) which is substantially aligned in the radial direction with the projection 28 of the disk wheel 27. After welding the toothed ring 26 and the disk wheel 27, the projections 28 and 30 may be machined down so that the toothed ring 27 and the disk wheel 26 merge with one another in an aligned manner.

Figure 10:
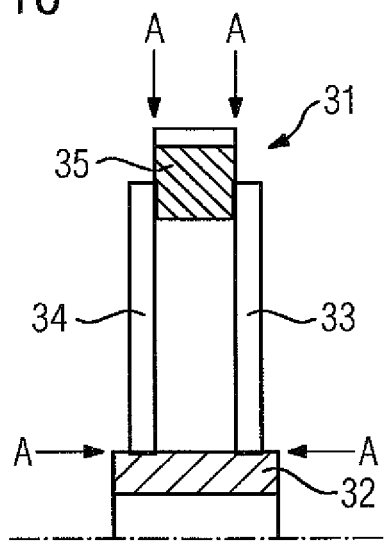
FIG. 10 is a schematic view of a large transmission gearwheel according to a sixth embodiment of the present invention in which the toothed ring and disk wheel are welded together radially.

FIG. 10 is a schematic view of a hybrid large transmission gearwheel 31 according to a further embodiment of the present invention, which also is produced from a hub 32, two disk wheels 33 and 34 and a toothed ring 35. Whilst the hub 32 is welded to the disk wheels 33 and 34 in the axial direction, as in the previous embodiments, the disk wheels 33 and 34 are welded to the toothed ring 35 in this embodiment in the radial direction. It should be clear that for the weld seams weld pool supports are also provided by a corresponding design of the hub 32, the disk wheels 33 and 34 and the toothed ring 35, even if this is not shown in the schematic illustration according to FIG. 10.

Figure 11:
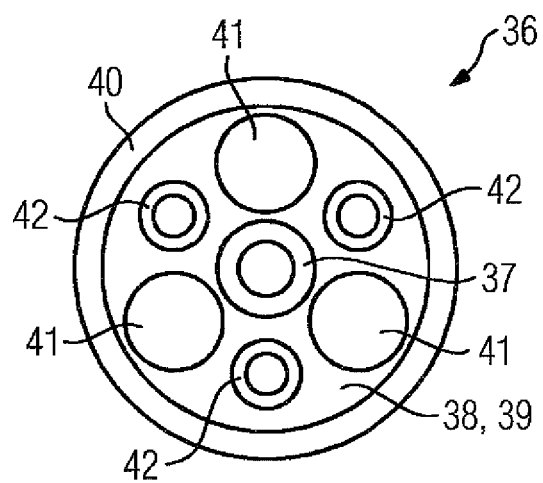
FIG. 11 is a schematic side view of a large transmission gearwheel according to a seventh embodiment of the present invention.

FIG. 11 shows a schematic side view of a large transmission gearwheel 36 according to a further embodiment of the present invention. The large transmission gearwheel 36 is also a hybrid gearwheel which consists of a hub 37, two disk wheels 38 and 39, and a toothed ring 40 which are welded together. The design of the large transmission gearwheel 36 substantially corresponds to that of the large transmission gearwheel 1 shown in FIGS. 1 to 3. In contrast to the large transmission gearwheel 1, however, the recesses 41 are symmetrically arranged in the gearwheel 31 and have a circular shape. Moreover, axially extending tubular strips 42 which connect the disk wheels 38 and 39 together are provided, whereby the structure is additionally reinforced. In other respects, the structures of the large transmission gearwheels 1 and 36 correspond to one another.

Although the invention in detail has been illustrated and described more specifically by the preferred exemplary embodiment, the invention is not limited by the disclosed examples and other variants may be derived therefrom by the person skilled in the art, without departing from the protected scope of the invention.

The invention claimed is:

1. A method for producing a large transmission gearwheel, comprising:
    at least partially mechanically soft machining individual components of a large transmission gearwheel, with the individual components involving a hub, a disk wheel of case-hardened steel, and a toothed ring;
    joining the individual components using a beam welding method;
    case hardening the joined individual components thereby producing the large transmission gearwheel having a flank strength of at least 1250 N/mm$^2$; and directly after case hardening hard machining at least the toothed ring for configuring the disk wheel asymmetrically.

2. The method of claim 1, wherein the beam welding method is an electron beam welding method.

3. The method of claim 1, wherein the beam welding method includes laser beam welding.

4. The method of claim 3, further comprising executing the laser beam welding under vacuum or partial vacuum.

5. The method of claim 1, wherein hard machining includes hard turning and gear teeth grinding of at least the toothed ring.

6. The method of claim 1, further comprising providing the disk wheel with at least one eccentric recess.

7. The method of claim 1, further comprising providing the disk wheel with a plurality of eccentric recesses.

8. The method of claim 1, further comprising adjusting a deformation of the large transmission gearwheel by the asymmetrical configuration of the disk wheel.

9. The method of claim 1, further comprising adjusting a stiffness of the large transmission gearwheel by an asymmetrical configuration of a thickness of the toothed ring.

10. The method of claim 1, wherein the individual components involve two of said disk wheel arranged in axially spaced-apart relationship, and further comprising mounting the two disk wheels from one side relative to the toothed ring, with the soft machining of the individual components executed from said side.

11. The method of claim 1, further comprising executing the beam welding method to produce at least one weld joint, which, viewed in the welding direction, has a rear end formed by a radially protruding projection which is part of one of the individual components to be welded together by the beam welding method.

* * * * *